United States Patent
McIlvaine et al.

(10) Patent No.: US 7,210,024 B2
(45) Date of Patent: Apr. 24, 2007

(54) CONDITIONAL INSTRUCTION EXECUTION VIA EMISSARY INSTRUCTION FOR CONDITION EVALUATION

(75) Inventors: Michael Scott McIlvaine, Raleigh, NC (US); James Norris Dieffenderfer, Apex, NC (US); Jeffrey Todd Bridges, Raleigh, NC (US); Thomas Andrew Sartorius, Raleigh, NC (US); Rodney Wayne Smith, Raleigh, NC (US)

(73) Assignee: Qualcomm Incorporated, San Diego, CA (US)

( * ) Notice: Subject to any disclaimer, the term of this patent is extended or adjusted under 35 U.S.C. 154(b) by 310 days.

(21) Appl. No.: 11/055,919

(22) Filed: Feb. 10, 2005

(65) Prior Publication Data

US 2006/0179288 A1   Aug. 10, 2006

(51) Int. Cl.
  *G06F 9/30* (2006.01)
(52) U.S. Cl. .......... 712/208; 712/23; 712/216; 712/234
(58) Field of Classification Search .......... 712/23, 712/208, 216, 234
  See application file for complete search history.

(56) References Cited

U.S. PATENT DOCUMENTS 6,016,543 A * 1/2000 Suzuki et al. .............. 712/233
6,170,052 B1 * 1/2001 Morrison .................... 712/236
6,505,296 B2 * 1/2003 Morris et al. ............... 712/244
6,598,153 B1   7/2003 Flachs et al.
7,103,882 B2 * 9/2006 Kawahito .................... 717/151

FOREIGN PATENT DOCUMENTS

WO   0242902   5/2002

OTHER PUBLICATIONS

Optimization for a Superscalar Out-of-Order Machine, Ann M. Holler, 1996 IEEE, pp. 336-348.

* cited by examiner

*Primary Examiner*—William M. Treat
(74) *Attorney, Agent, or Firm*—Nicholas J. Pauley; Thomas Rouse

(57) ABSTRACT

Hazard detection is simplified by converting a conditional instruction, operative to perform an operation if a condition is satisfied, into an emissary instruction operative to evaluate the condition and an unconditional base instruction operative to perform the operation. The emissary instruction is executed, while the base instruction is halted. The emissary instruction evaluates the condition and reports the condition evaluation back to the base instruction. Based on the condition evaluation, the base instruction is either launched into the pipeline for execution, or it is discarded (or a NOP, or null instruction, substituted for it). In either case, the dependencies of following instructions may be resolved.

19 Claims, 3 Drawing Sheets

CONDITIONAL INSTRUCTION EXECUTION VIA EMISSARY INSTRUCTION FOR CONDITION EVALUATION

BACKGROUND

The present invention relates generally to the field of processors and in particular to a method of conditional instruction execution via an emissary instruction for condition evaluation.

Microprocessors perform computational tasks in a wide variety of applications. High execution speed, low power consumption and small size are commonly important goals for processor designers, particularly in embedded applications such as portable electronic devices. An important consideration, however, is accuracy. Whatever architectural features are included in the processor design to improve execution speed or other metric needs also to assure the correct execution of software code.

Many modern processors employ a pipelined architecture, where sequential instructions, each having multiple execution steps, are overlapped in execution. For improved performance, the instructions should flow continuously through the pipeline. However, instructions may become stalled in the pipeline for a variety of reasons, such as data dependencies between instructions, also known as data hazards. High performance processors may employ a superscalar design, where part of the pipeline is replicated. Multiple pipelines can minimize the effect of pipeline stalls on overall system performance, as instructions awaiting a stalled pipeline may be dispatched to another pipeline for immediate execution.

To take maximum advantage of the potential performance gain offered by superscalar pipelines, high performance processors commonly support out-of-order execution. That is, instructions may be executed in other than their program order, if doing so is not precluded by inter-dependencies among the instructions. As one example of such dependencies, an instruction performing a logical or arithmetic operation that reads an operand from a register cannot execute until a prior instruction, that writes a result to that register, has calculated its result (data can be forwarded, where completed may imply the instruction has left the pipeline). These two instructions cannot be executed out of order, or an incorrect result will occur. The process of detecting dependencies among instructions is known as hazard detection. Hazard detection is commonly performed very early in the pipeline, prior to dispatching instructions into an execution pipeline.

Most instruction set architectures include conditional instructions, which are instructions that perform some operation—or not—depending on the evaluation of a condition. Condition evaluation is typically performed in an execute pipe stage, deep in the pipeline. Conditional instructions can greatly complicate hazard detection by delaying knowledge of whether the operation will be executed until deep in the pipeline. However, knowledge of whether or not the operation will affect, e.g., the contents of a register, is required early in the pipeline for hazard detection. The following example code segment illustrates this problem:

| ADD | r1, r7, r8 | add contents of r7 and r8, place sum in r1 |
| CMP | r1, r12 | compare contents of r1 and r12 (set code or flag to reflect the result of the comparison) |
| ADDEQ | r1, r8, r9 | if the previous compare was equal, add contents of r8 and r9 and place sum in r1. Otherwise, r1 is not changed |
| ADDNE | r1, r3, r4 | if the previous compare was not equal, add contents of r3 and r4 and place sum in r1. Otherwise, r1 is not changed |
| AND | r10, r6, r1 | logical AND the contents of r6 to the contents of r1, place the result in r10 |

The final AND instruction has an r1 dependency on the ADDNE instruction. That is, the ADDNE must calculate its result prior to the AND executing, so that the data written into r1 by the ADDNE will be available to the AND. However, the ADDNE is a conditional instruction, and may not execute the ADD operation. In this case, the true dependency of the AND instruction is on the ADDEQ instruction. In the foregoing example (depicting a common software construct), exactly one of the ADDEQ and ADDNE instructions will execute, since the conditions EQ (equal) and NE (not equal) are mutually exclusive and exhaustive. However, in general, since the ADDEQ instruction is conditional, the AND may actually have a dependency on an earlier instruction, in this case the initial ADD. Additionally, if a prior conditional instruction does not execute, a following instruction may have no dependency at all.

The contingent dependencies presented by conditional instructions, and in particular the possible multi-level contingent dependencies, greatly complicate the task of accurate hazard detection, which is necessary for accurately conducting out-of-order program execution.

SUMMARY

In one embodiment, a conditional instruction, operative to perform an operation if a condition is satisfied, is converted to an emissary instruction operative to evaluate the condition and an unconditional base instruction operative to perform the operation. The emissary instruction is executed, while the base instruction is halted. The emissary instruction evaluates the condition and reports the condition evaluation back to the base instruction. Based on the condition evaluation, the base instruction is either launched into the pipeline for execution, or it is discarded (or a NOP, or null instruction, substituted for it). In either case, the dependencies of following instructions may be resolved.

In another embodiment, a processor comprises an instruction execution pipeline including an instruction issue pipe stage and a condition evaluation pipe stage. The processor includes a feedback path from the condition evaluation pipe stage to the instruction issue pipe stage. The processor further includes a pipeline controller operative to convert a conditional instruction into an emissary instruction and an unconditional base instruction at the instruction issue pipe stage, issue the emissary instruction, and conditionally issue the base instruction in response to feedback from the condition evaluation pipe stage by the emissary instruction.

In another embodiment, a conditional instruction, operative to perform an operation only if a condition is satisfied, is decoded. The conditional instruction is converted to an emissary instruction operative to evaluate the condition, and an unconditional base instruction operative to perform the operation. The emissary instruction is executed. If the condition is not satisfied, it is determined that no other instruction is dependent on the conditional instruction.

Another embodiment relates to a method of performing hazard detection in a pipelined processor. A conditional instruction is decoded, where the conditional instruction is operative to perform an operation only if a condition is TRUE. The conditional instruction is converted into two separate instructions, an emissary instruction, and an unconditional base instruction operative upon execution to perform the operation. The emissary instruction is executed and caused to evaluate the condition. The base instruction is executed or not depending upon the evaluation of the condition by the emissary instruction. A data dependency between one or more following instructions and the base instruction is detected.

Another embodiment relates to a method of executing a conditional instruction. The conditional instruction is converted into an emissary instruction and a base instruction. The emissary instruction is executed. The base instruction is conditionally executed in response to a condition evaluation by the emissary instruction.

DETAILED DESCRIPTION

Figure 1:
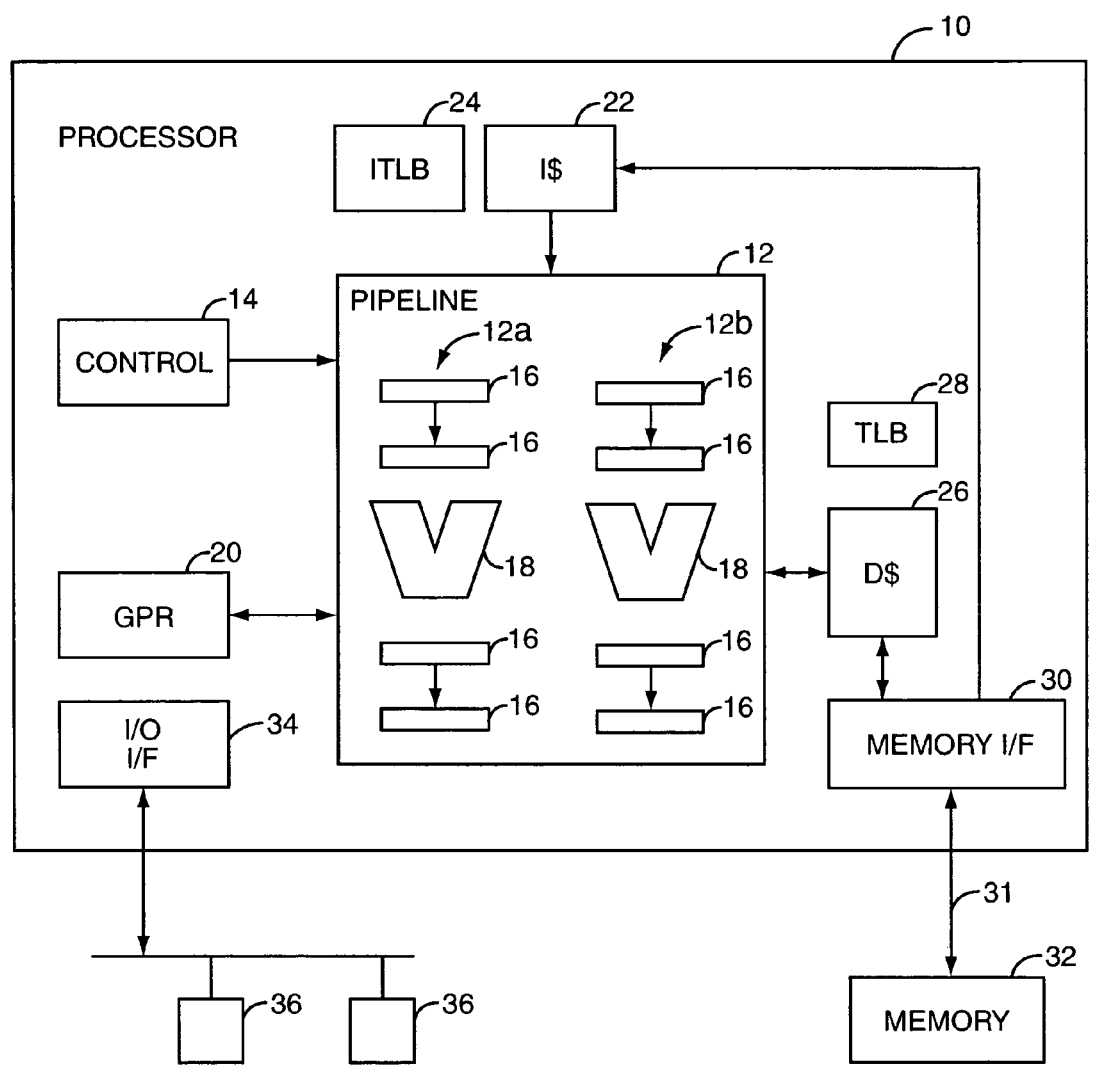
FIG. 1 is a functional block diagram of a processor.

FIG. 1 depicts a functional block diagram of a processor 10. The processor 10 executes instructions in an instruction execution pipeline 12 according to control logic 14. The pipeline 12 may be a superscalar design, with multiple parallel pipelines such as 12a and 12b. The pipelines 12a, 12b include various registers or latches 16, organized in pipe stages, and one or more Arithmetic Logic Units (ALU) 18. A General Purpose Register (GPR) file 20 provides registers comprising the top of the memory hierarchy. The pipelines 12a, 12b fetch instructions from an Instruction Cache (I-Cache or I$) 22, with memory addressing and permissions managed by an Instruction-side Translation Lookaside Buffer (ITLB) 24.

Data is accessed from a Data Cache (D-Cache or D$) 26, with memory addressing and permissions managed by a main Translation Lookaside Buffer (TLB) 28. In various embodiments, the ITLB may comprise a copy of part of the TLB. Alternatively, the ITLB and TLB may be integrated. Similarly, in various embodiments of the processor 10, the I-cache 22 and D-cache 26 may be integrated, or unified. Misses in the I-cache 22 and/or the D-cache 26 cause an access to main (off-chip) memory 32, under the control of a memory interface 30. The processor 10 may include an Input/Output (I/O) interface 34, controlling access to various peripheral devices 36. Those of skill in the art will recognize that numerous variations of the processor 10 are possible. For example, the processor 10 may include a second-level (L2) cache for either or both the I and D caches. In addition, one or more of the functional blocks depicted in the processor 10 may be omitted from a particular embodiment.

Figure 2:
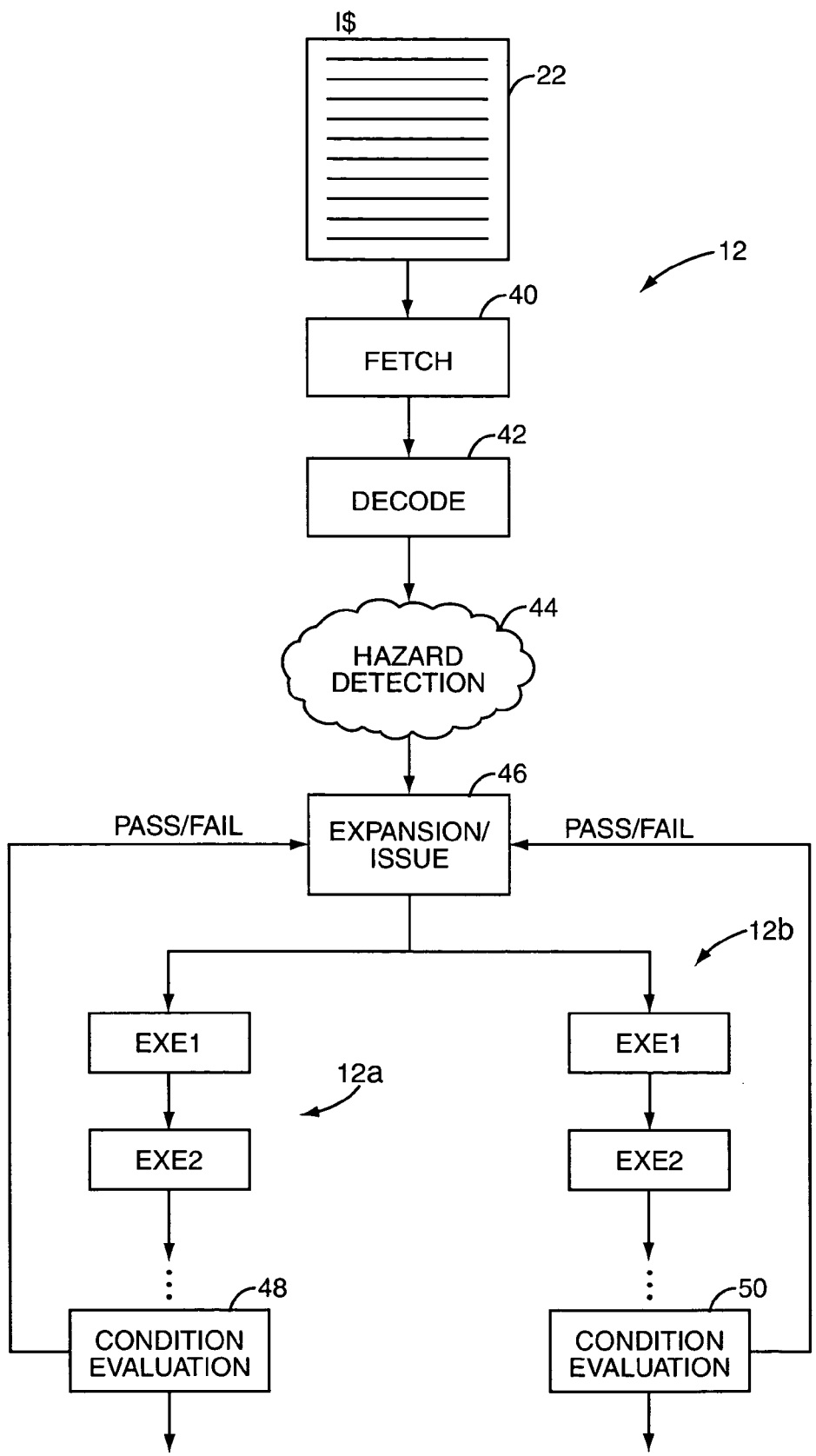
FIG. 2 is a functional block diagram of a superscalar pipeline.

FIG. 2 depicts a superscalar pipeline architecture. Processor pipeline 12 includes an instruction fetch pipe stage 40, fetching instructions from the I-Cache 22. The instructions are decoded at a decode pipe stage 42. Once the instruction is known, hazard detection logic 44 detects dependencies between the decoded instruction and instructions that are currently executing, such as instructions that generate operands needed by the decoded instruction. Following the hazard detection logic 44 is an expansion/issue pipe stage 46, that issues the decode instruction into one of multiple execution pipelines 12a, 12b.

As discussed above, hazard detection is greatly complicated by conditional instructions. To simplify this task, the conditional instructions may be transformed into two related instructions: an emissary instruction and a base instruction. As used herein, an "emissary instruction" is an instruction whose sole operation is the evaluation of the condition of a conditional instruction, and reporting that condition evaluation back to the base instruction. The emissary instruction does not read or write any general purpose register, does not alter any condition code, and does not perform any memory access. For example, the emissary instruction corresponding to the conditional instruction "ADDEQ r1, r3, r4 " is an instruction that detects and reports the EQ (equal) condition, e.g., by inspecting an EQ bit in a condition register that was set by a prior compare or other instruction. The emissary instruction neither reads r3 or r4, nor writes r1.

As used herein, a "base instruction" is an unconditional instruction that performs the same operation, with the same operands and destination, as the conditional instruction would perform if its condition evaluated TRUE. For example, the base instruction corresponding to the conditional instruction "ADDEQ r1, r3, r4 " is "ADD r1, r3, r4 ". In one embodiment, the base instruction is halted at the issue pipe stage 46, pending the evaluation of its condition.

Once the conditional instruction is transformed into an emissary instruction and a base instruction, the emissary instruction is launched into an execution pipeline 12a, 12b, while the base instruction is halted. The emissary instruction proceeds until it reaches a condition evaluation pipe stage 48, 50. There, the emissary instruction evaluates the condition relevant to the conditional instruction, and reports the condition evaluation back to the base instruction halted at the issue pipe stage 46. The emissary instruction may then proceed through the remaining pipeline 12a, 12b; may be replaced by a NOP (no-op or null instruction) that proceeds through the remaining pipeline 12a, 12b; or it may be discarded and the resulting pipe "bubble" filled by the next following instruction in the pipeline 12a, 12b. In short, the emissary instruction's useful life is over upon the evaluation and reporting of the conditional instruction's condition evaluation, and the emissary instruction may then be disposed of in any manner that does not affect the processor's program state, as well understood by those of skill in the art.

Upon reporting of the condition evaluation by the emissary instruction, the base instruction halted at the issue pipe stage 46 is launched into an available execution pipeline 12a, 12b if the condition evaluation is TRUE. A condition evaluation is considered TRUE if the condition is satisfied or a conditional test PASSes. Conversely, a condition evaluation is FALSE if the condition is not satisfied or a conditional test FAILs. In the case of a TRUE condition evaluation, the unconditional base instruction executes, and its effect on the register file or memory is known. Thus, the hazard detection logic 44 may perform hazard detection for all instructions following the base instruction that read any register or memory location that the base instruction writes.

If the condition evaluation reported by the emissary instruction is FALSE, the base instruction is not executed. The base instruction may be replaced by a NOP, which is launched into an available execution pipeline 12a, 12b. Alternatively, the base instruction may be discarded, and a following instruction advanced to fill the pipeline bubble. In either case, the hazard detection logic 44 knows that the base instruction (and correspondingly, the original conditional instruction) did not alter any register or memory location, and that no following instruction has any dependency on the original conditional instruction. The hazard detection logic 44 may then look past the conditional instruction to one or more prior instructions, to determine a following instruction's actual dependency(s).

Figure 3:
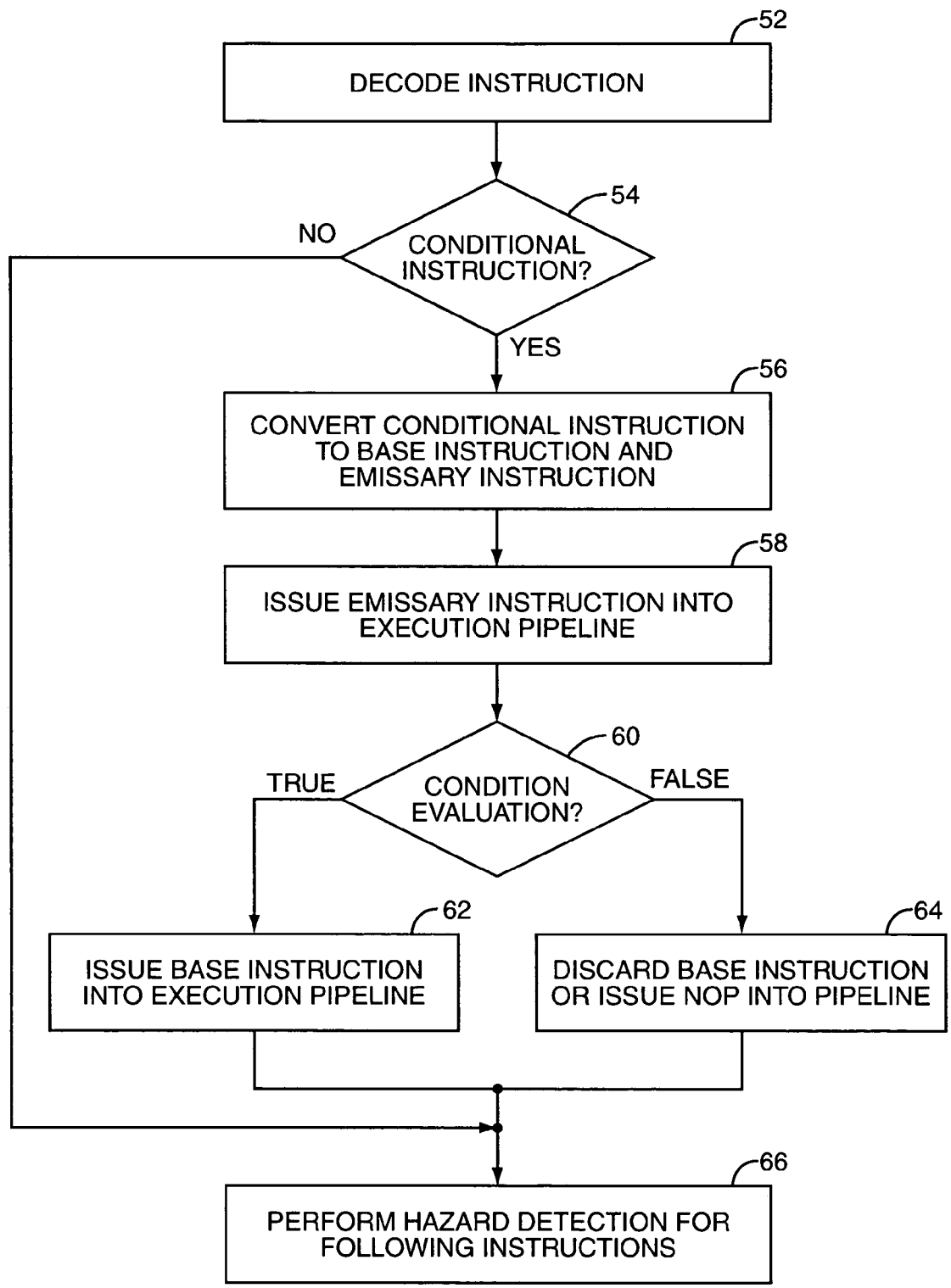
FIG. 3 is a flow diagram of conditional instruction execution.

This process is depicted in flow diagram form in FIG. 3. Following instruction decode (block 52), if an instruction is a conditional instruction (block 54), it is converted to an emissary instruction and a base instruction (block 56). The base instruction is halted at an instruction issue pipe stage 46, and the emissary instruction is issued into an available execution pipeline 12*a*, 12*b* (block 58). When the emissary instruction reaches a condition evaluation pipe stage 48, 50, it evaluates the condition (block 60) and reports the condition evaluation to the base instruction. If the condition evaluates TRUE, the base instruction is issued into an available pipeline 12*a*, 12*b* (block 62). If the condition evaluates FALSE, the base instruction is either discarded or converted to a NOP, which is issued into the pipeline 12*a*, 12*b* (block 64 ). In either case, and also if the decoded instruction is not a conditional instruction (block 54), hazard detection is performed for following instructions (block 66 ), as it is known whether or not the conditional instruction will execute.

Although the present inventive concepts have been described herein with respect to particular features, aspects and embodiments thereof, it will be apparent that numerous variations, modifications, and other embodiments are possible within the broad scope of the present inventive concepts, and accordingly, all variations, modifications and embodiments are to be regarded as being within the scope of the inventive concepts disclosed herein. The present embodiments are therefore to be construed in all aspects as illustrative and not restrictive and all changes coming within the meaning and equivalency range of the appended claims are intended to be embraced therein.

What is claimed is:

1. A method of executing a conditional instruction in a pipelined processor, the conditional instruction operative to perform an operation if a condition is satisfied, comprising:
    converting said conditional instruction into an emissary instruction operative to determine whether the condition is satisfied and an unconditional base instruction operative to perform said operation;
    executing said emissary instruction; and
    executing said unconditional base instruction if execution of the emissary instruction indicates that the condition is satisfied.

2. The method of claim 1 further comprising executing a NOP instruction in place of the unconditional base instruction if execution of the emissary instruction indicates that the condition is not satisfied.

3. The method of claim 1 further comprising discarding said base instruction if execution of the emissary instruction indicates that the condition is not satisfied.

4. The method of claim 1 further comprising performing hazard detection for an instruction following said conditional instruction, after executing said emissary instruction.

5. A processor, comprising:
    an instruction execution pipeline including an instruction issue pipe stage and a condition evaluation pipe stage;
    a feedback path from said condition evaluation pipe stage to said instruction issue pipe stage; and
    a pipeline controller operative to convert a conditional instruction into an emissary instruction and an unconditional base instruction at said instruction issue pipe stage, issue said emissary instruction, and conditionally issue said base instruction in response to feedback from said condition evaluation pipe stage by said emissary instruction.

6. The processor of claim 5 further comprising hazard detection logic operative to detect dependencies on said conditional instruction by following instructions, after said condition evaluation.

7. A method of performing hazard detection in a pipelined processor, comprising:
    decoding a conditional instruction, said conditional instruction operative to perform an operation only if a condition is satisfied;
    converting said conditional instruction into an emissary instruction operative to evaluate said condition, and an unconditional base instruction operative to perform said operation;
    executing said emissary instruction to obtain a condition evaluation; and
    determining no following instruction is dependent on said conditional instruction if said condition is not satisfied.

8. The method of claim 7 further comprising detecting a dependency of any following instruction that reads a register or memory location written by said conditional instruction if said condition is satisfied.

9. The method of claim 8 further comprising executing said unconditional base instruction if said condition is satisfied.

10. The method of claim 9 wherein said dependency is detected prior to executing said unconditional base instruction.

11. The method of claim 10 further comprising stalling a following instruction for which a dependency is detected, until said unconditional base instruction completes execution.

12. The method of claim 7 further comprising executing a NOP instruction in place of said unconditional base instruction if said condition is not satisfied.

13. The method of claim 7 further comprising discarding said base instruction if said condition is not satisfied.

14. A method of performing hazard detection in a pipelined processor, comprising:
    decoding a conditional instruction where the conditional instruction is operative to perform an operation only if a condition is TRUE;
    converting the conditional instruction into two separate instructions, an emissary instruction, and an unconditional base instruction operative upon execution to perform the operation;
    executing the emissary instruction and causing the emissary instruction to evaluate the condition;
    executing or not executing the base instruction depending upon the evaluation of the condition by the emissary instruction; and
    detecting a data dependency between one or more following instructions and the base instruction.

15. The method of claim 14 further comprising, in response to detecting the dependency, delaying the execution of one or more of the following instructions until the base instruction has performed the operation.

16. The method of claim 14 further comprising, in response to detecting no dependency on the base instruction by one or more following instructions, immediately launching the one or more following instructions for execution.

17. A method of executing a conditional instruction, comprising:
   converting said conditional instruction into an emissary instruction and a base instruction;
   executing said emissary instruction, and
   conditionally executing said base instruction in response to a condition evaluation by said emissary instruction.

18. The method of claim 14 further comprising performing hazard detection on one or more instructions following said conditional instruction.

19. The method of claim 18 wherein no dependency exists between one or more following instructions and said conditional instruction if said base instruction is not executed.

* * * * *